UNITED STATES PATENT OFFICE.

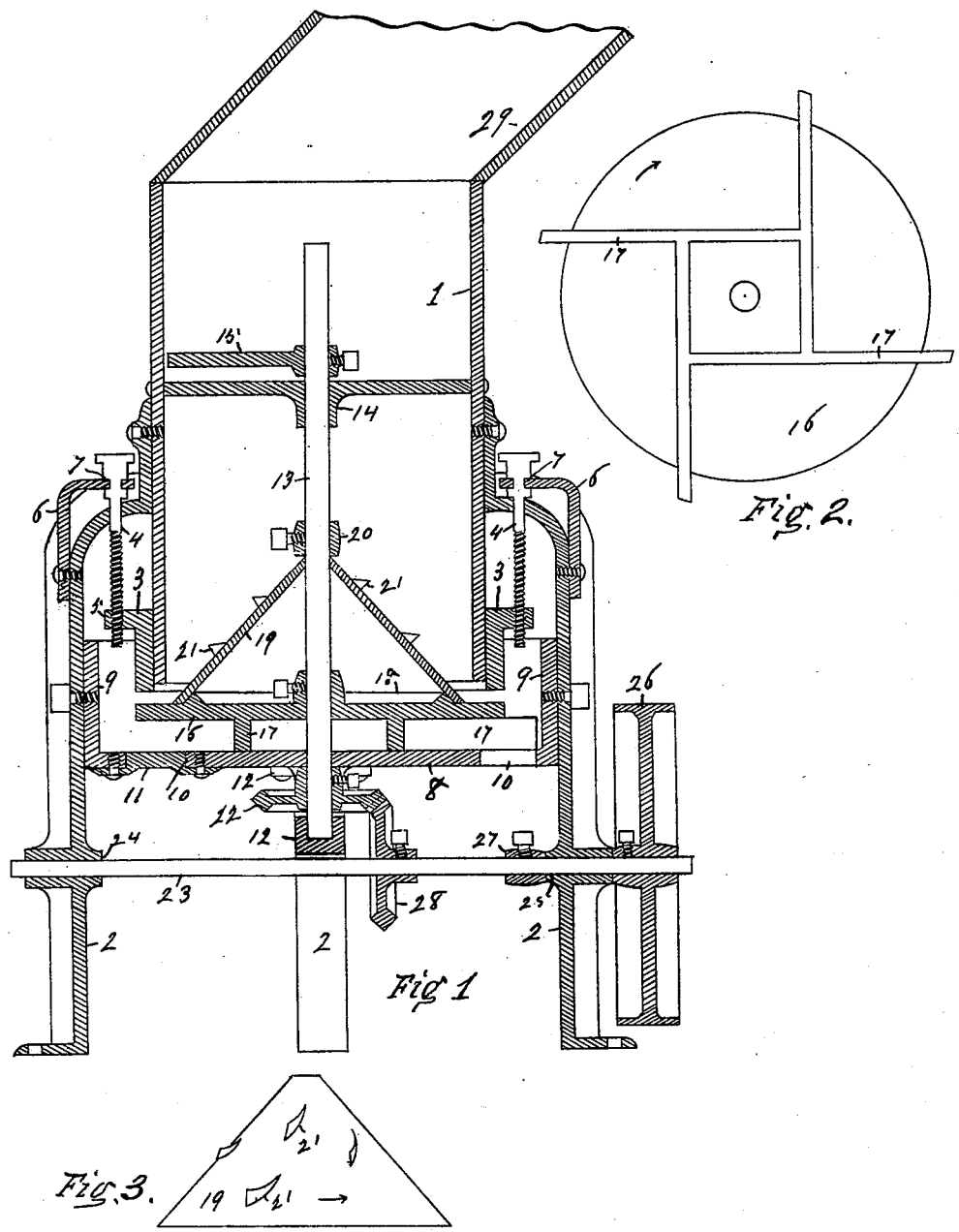

JAMES FRAZIER, OF HAMILTON, OHIO.

FEEDER AND MIXER.

SPECIFICATION forming part of Letters Patent No. 592,774, dated November 2, 1897.

Application filed January 27, 1897. Serial No. 620,869. (No model.)

*To all whom it may concern:*

Be it known that I, JAMES FRAZIER, a citizen of the United States, residing at Hamilton, in the county of Butler and State of Ohio, have invented certain new and useful Improvements in Feeders and Mixers, of which the following is a specification.

My invention relates to that class of feeders and mixers used in flouring-mills and adapted to feeding and mixing bran, meal, middlings, sweepings, and like substances; and my improvement consists in the form of construction and adaptation of the various parts to best accomplish the purpose intended.

These objects are obtained in the following-described manner, as illustrated in the accompanying drawings, in which—

Figure 1 is a vertical diametrical section of the complete machine; Figs. 2 and 3, details of construction.

In the drawings, 1 represents the hopper or mixing-receptacle, mounted on legs 2; 3, an annular sleeve encircling the lower portion of the hopper and adjustably depending therefrom; 4, hand-screws journaled in the upper portion of the legs and threaded into flange 5 of the annular sleeve to effect the vertical adjustment of the sleeve on the hopper; 6, arms secured on the legs, which, resting in grooves 7, formed in the shanks of the hand-screws, prevent endwise movement of the screws. The bottom 8 of the machine is circular in form and constructed with upwardly-projecting rim 9. It is securely fastened to the inner portion of the legs beneath the hopper. Openings 10 through the bottom are located at intervals near the rim 9. Plates 11 serve to close said openings flush with the top surface of the bottom. Any of the plates may be removed to form an exit for the material in a direction corresponding to the position of said opening in the bottom without changing the position of the machine. Step-bearing 12 is secured to bottom 8 and depends below its center. Vertical shaft 13 is journaled therein and in bearing 14, that spans the hopper and holds the shaft in the axial line thereof. Any desired number of arms 15 are secured to shaft 13 within the hopper to effect a thorough mixing of the contents thereof. Circular disk 16 is secured to shaft 13 and rotates directly over and parallel with bottom 8. Its periphery reaches to the outside of sleeve 3. Sweepers 17 are formed integral with and depend below the under side of the disk, as shown in Fig. 2. They serve to sweep and mix the material deposited on bottom 8 and cause it to spill through any one or more of the exit-openings 10 that may have plates 11 removed therefrom. Annular ridge 18 is formed on the top surface of disk 16, some distance from and concentric with its periphery. Cone 19, Fig. 3, preferably formed of sheet metal, rests with its base on the disk and over the said ridge thereon. Said cone contains an opening through its apex for passage of shaft 13. Collar 20 on the vertical shaft serves to secure the cone in its proper position on the disk. Flights 21 project from the surface of the cone and extend downwardly and rearwardly from the direction of its rotation to impel the ingredients in the hopper toward and through the narrow annular opening between disk 16 and sleeve 3. Miter-gear 22 is interposed between bottom 8 and step-bearing 12, that depends therefrom, and is secured to the vertical shaft in the usual manner. Horizontal driving-shaft 23 is journaled in bearings 24 and 25, formed in opposite legs 2. Driving-pulley 26 may be secured on either extremity of shaft 23, as desired. Collar 27 secures said shaft from endwise movement. Miter-gear 28 may be secured on shaft 23 to engage with and drive gear 22 on either side of step-bearing 12. The horizontal shaft may thus be rotated in either direction corresponding to the position of the gear thereon, while the direction of rotation of the vertical shaft remains the same.

29 is a chute or conveyer leading to the hopper.

In operation the ingredients are conveyed through one or more chutes to the interior of the hopper, where they are thoroughly commingled by the rotary sweeping movement of one or more arms 15 and by the flights 21. Thence the contents of the hopper are distributed evenly through the annular space under sleeve 3 into receptacle formed by the bottom and its rim. Sweepers 17 continue the mixing process on the bottom and push the ingredients through openings 10 and into an exit-chute. (Not shown.)

Having fully described my improvement, what I claim as my invention, and desire to secure by Letters Patent, is—

1. In a feeder and mixer, the combination, with legs, of a hopper secured thereto, a shaft journaled vertically within the hopper, a disk upon the shaft, the upper surface of which is provided with a concentric ridge, a cone upon the ridge, the apex of which surrounds the shaft, and a vertically-adjustable sleeve encircling the lower end of the hopper adjacent to the disk, substantially as set forth.

2. In a feeder and mixer, the combination, with legs, of a hopper secured thereto, a disk below the hopper, the upper surface of which is provided with a concentric ridge and the lower surface of which is provided with sweepers, the ends of which extend beyond the periphery of the disk, an adjustable sleeve encircling the lower end of the hopper adjacent to the disk, and a bottom below the disk provided with openings and means for closing the same, substantially as set forth.

JAMES FRAZIER.

Witnesses:
SHERMAN WILLIAMS,
ROBERT S. CARR.